(12) United States Patent
Katsura

(10) Patent No.: US 6,513,546 B2
(45) Date of Patent: Feb. 4, 2003

(54) CHECK VALVE

(75) Inventor: Masayoshi Katsura, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/788,534

(22) Filed: Feb. 21, 2001

(65) Prior Publication Data

US 2001/0018930 A1 Sep. 6, 2001

(30) Foreign Application Priority Data

Mar. 6, 2000 (JP) ........................................ 2000-060710

(51) Int. Cl.[7] .............................................. F16R 15/02
(52) U.S. Cl. ................................. 137/540; 137/543.17
(58) Field of Search .............................. 137/540, 543.17

(56) References Cited

U.S. PATENT DOCUMENTS

| | | | | |
|---|---|---|---|---|
| 1,886,205 A | * | 11/1932 | Lyford | 137/543.17 |
| 2,214,459 A | * | 9/1940 | Gottlieb | 251/145 |
| 2,840,107 A | * | 6/1958 | Cook, Jr. | 137/543.17 X |
| 2,895,503 A | * | 7/1959 | Kolthoff, Jr. | 137/535 |
| 2,950,736 A | * | 8/1960 | Oldberg | 137/529 |
| 3,336,942 A | * | 8/1967 | Keith | 137/529 |
| 4,579,141 A | * | 4/1986 | Arff | 137/223 |
| 4,613,738 A | * | 9/1986 | Saville | 219/686 |
| 4,746,105 A | * | 5/1988 | Allison | 251/902 X |
| 5,230,364 A | * | 7/1993 | Leng et al. | 137/514 |
| 5,577,533 A | * | 11/1996 | Cook, Jr. | 137/514.3 |
| 5,850,851 A | * | 12/1998 | Miura et al. | 137/583 |
| 5,873,385 A | * | 2/1999 | Bloom et al. | 137/543.19 |
| 6,152,114 A | * | 11/2000 | Kleppner | 123/514 |

FOREIGN PATENT DOCUMENTS

| JP | 3-179184 | 8/1991 |
|---|---|---|
| JP | 10-196521 | 7/1998 |

* cited by examiner

*Primary Examiner*—John Rivell
(74) *Attorney, Agent, or Firm*—Jones, Tullar & Cooper, P.C.

(57) ABSTRACT

The present invention provides a check valve in which correct sealing performance can be always ensured. In the check valve, a valve element 1 and a compression coil spring 2 which urges the valve element 1 in the valve closing direction are integrally molded by a synthetic resin material.

4 Claims, 5 Drawing Sheets

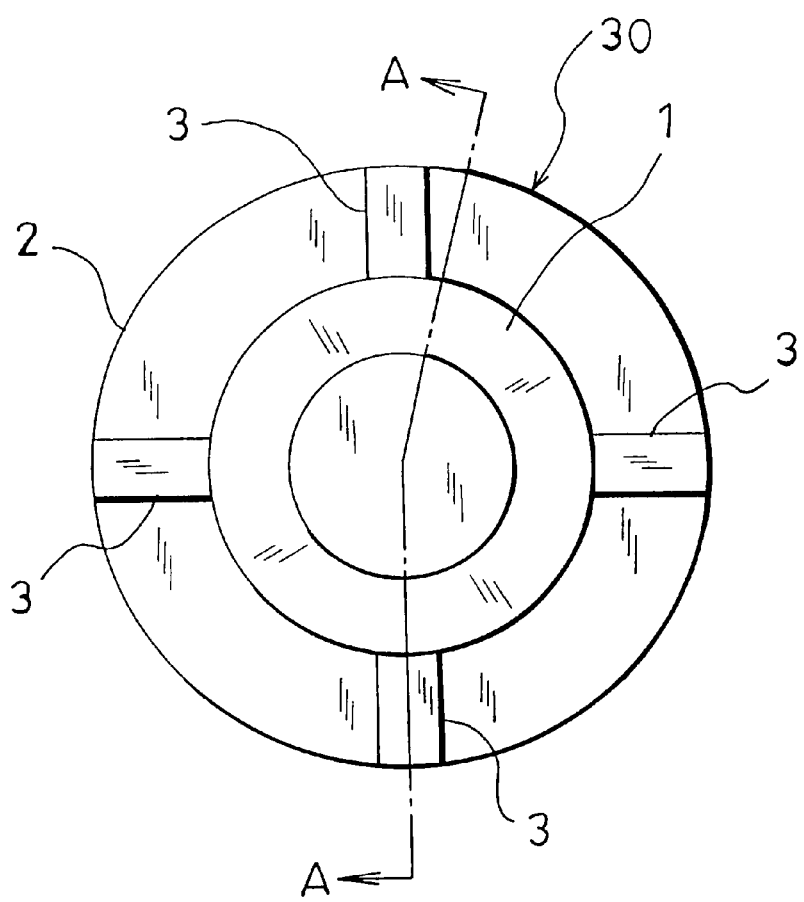

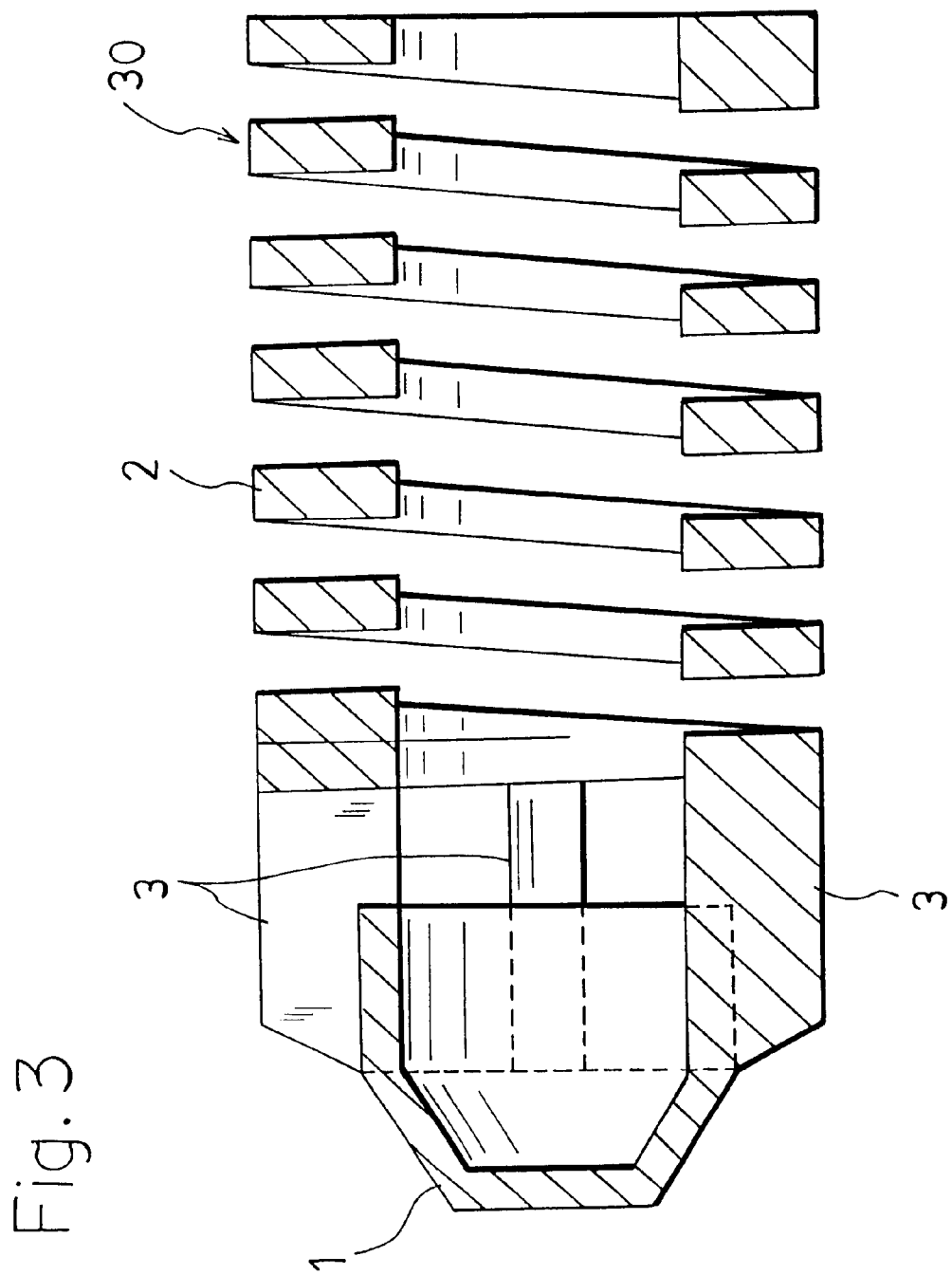

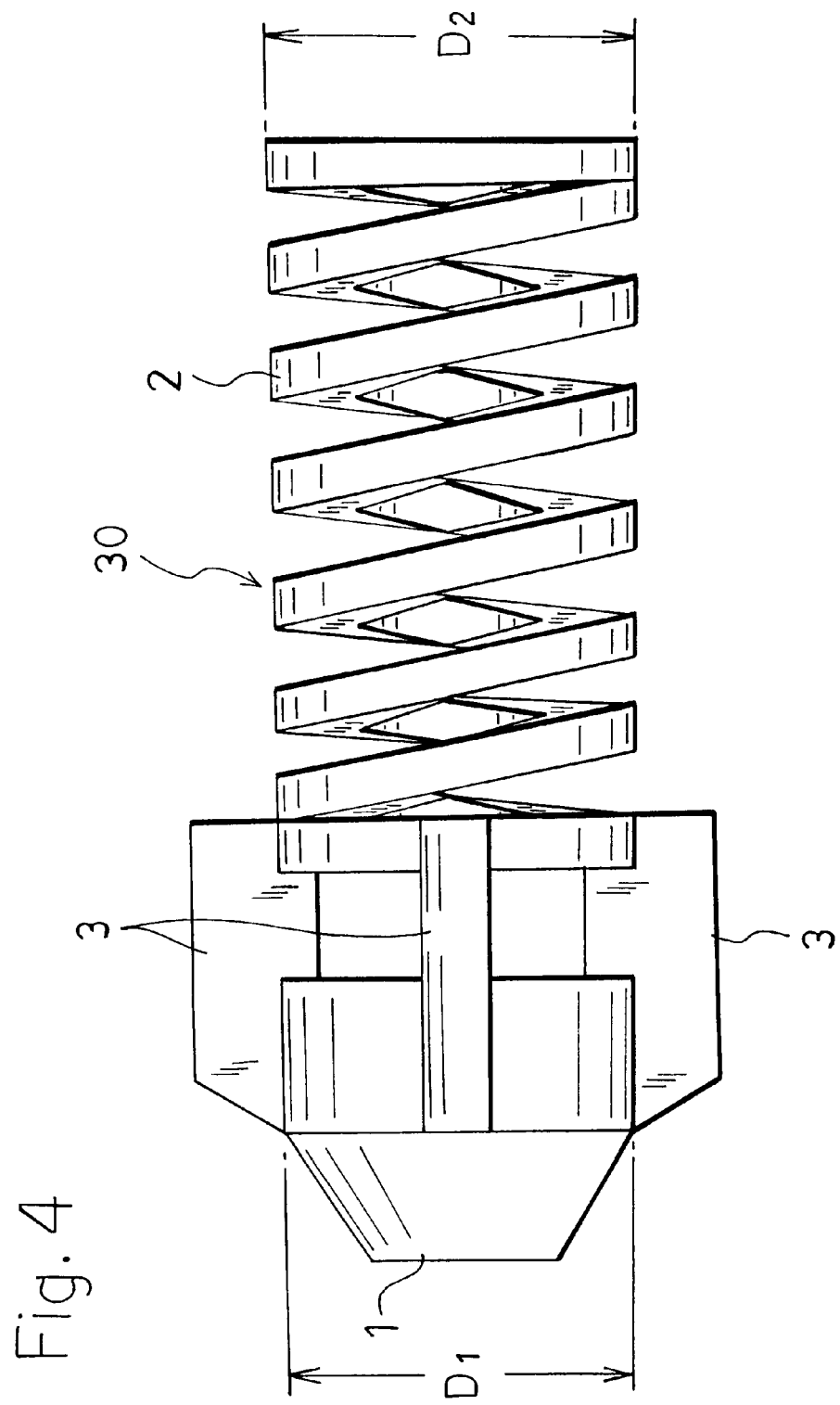

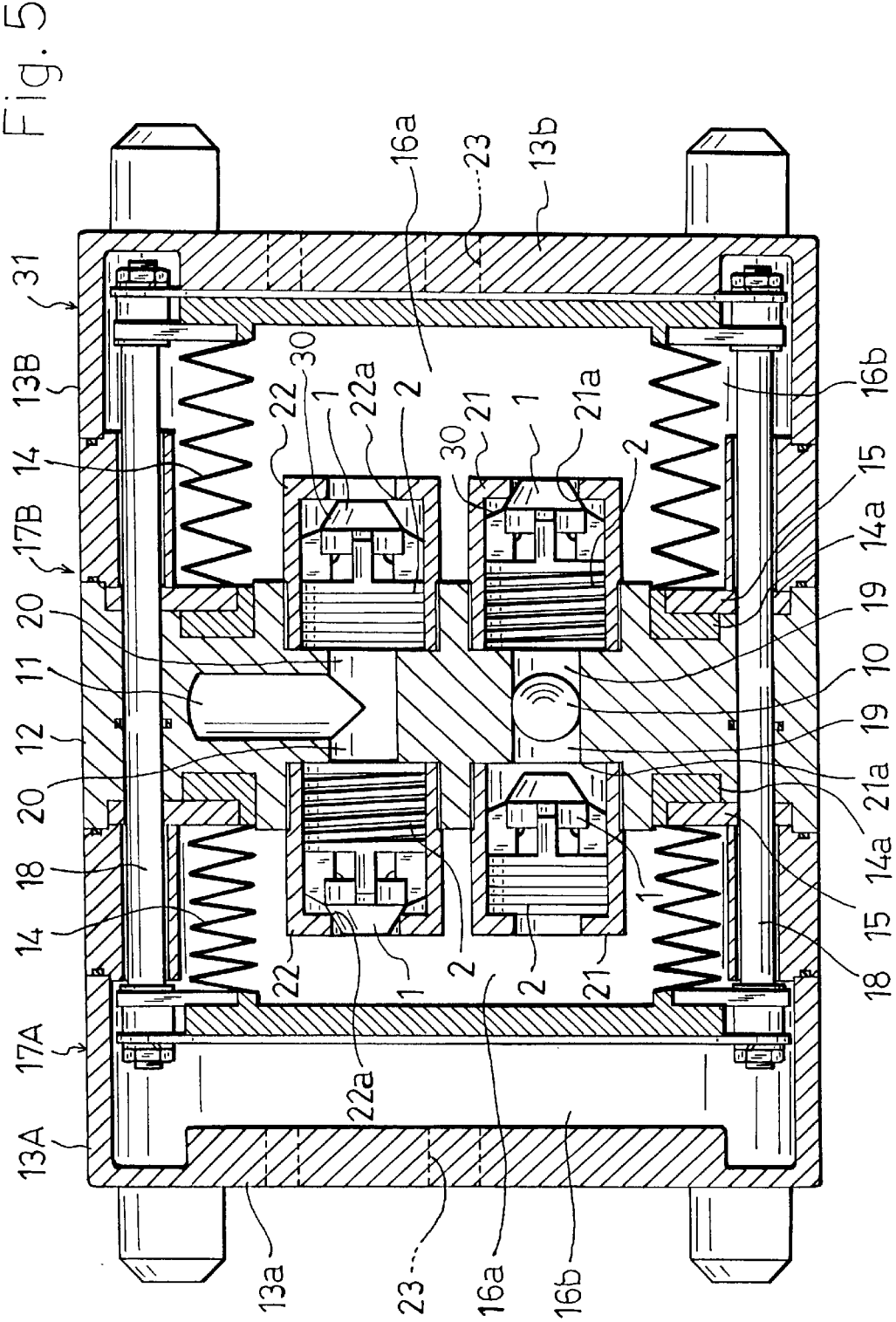

CHECK VALVE

BACKGROUND OF THE INVENTION

1. Field of the Invention

The present invention relates to a check valve which is to be attached to a fluid apparatus such as a reciprocating pump to prevent fluid from reversely flowing, thereby allowing the fluid to flow only in one direction.

2. Description of the Prior Art

In a reciprocating pump which is used for circulating or transporting chemical cleaning liquids in a semiconductor producing apparatus, for example, a check valve for sucking or discharging the transported liquid is attached. Such check valves include a valve of the gravity type in which closure is attained only by the weight of a valve element itself, and that of the spring type in which a valve element and a compression coil spring for urging the valve element so that the valve element is closely contacted with a valve seat are incorporated into a valve casing. A valve of the spring type is mainly employed because it is superior in sealing property than that of the gravity type (for example, Japanese Patent Application Laid-Open No. 3-179184 and Japanese Patent Application Laid-Open No. 10-196521).

In such a check valve of the spring type, the valve element and the compression coil spring are independently formed so to be separable from each other, and, during operation of the valve, the center axis of the compression coil spring therefore easily deviates with respect to that of the valve element. In the worst case, the valve element and the compression coil spring are nearly disengaged from each other. Therefore, the urging force exerted by the compression coil spring cannot adequately act on the valve element, thereby often producing a problem in that correct sealing performance due to the valve element is lowered or lost.

SUMMARY OF THE INVENTION

The present invention provides a solution to this problem. It is an object of the present invention to provide a check valve of the spring type in which correct sealing performance due to the valve element can be always ensured, and the work of incorporating the check valve into a fluid apparatus such as a reciprocating pump can be efficiently conducted.

The check valve of the present invention is configured by integrally forming a valve element and a compression coil spring which urges the valve element in a valve closing direction, by a metal or a synthetic resin.

In the check valve of the present invention, more specifically, the valve element is formed into a tapered truncated conical shape, the compression coil spring is formed into a cylindrical shape, and the valve element and the compression coil spring are integrally molded into a shape in which the valve element and the compression coil spring are connected to each other via a plurality of connecting rods that are integrally formed between a rear end portion of the valve element and a front end portion of the compression coil spring, so that center axes of the valve element and the compression coil spring coincide with each other. In this case, an outer diameter of the compression coil spring may be set to be larger than a maximum outer diameter of the valve element, or the maximum outer diameter of the valve element and the outer diameter of the compression coil spring may be set to be substantially equal to each other.

In the thus configured check valve, the valve element and the compression coil spring which are formed integrally with each other are not positionally deviated or disengaged from each other. Therefore, the urging force exerted by the compression coil spring can always adequately act on the valve element, and it is possible to exert stable sealing performance in which a reverse flow and liquid leakage can be always surely prevented from occurring.

As described above, the check valve of the present invention can always exert stable sealing performance, and is advantageous from the view point of the work of incorporating the check valve into a fluid apparatus such as a reciprocating pump.

BRIEF DESCRIPTION OF THE DRAWINGS

FIG. 2 is a front view of the check valve;

FIG. 3 is a section view taken along the line A—A of FIG. 2;

FIG. 4 is a side view of a check valve according to another embodiment of the present invention; and FIG. 5 is a longitudinal section view of a reciprocating pump to which the check valve of FIG. 1 is attached.

DETAILED DESCRIPTION OF THE PREFERRED EMBODIMENT

Figure 1:
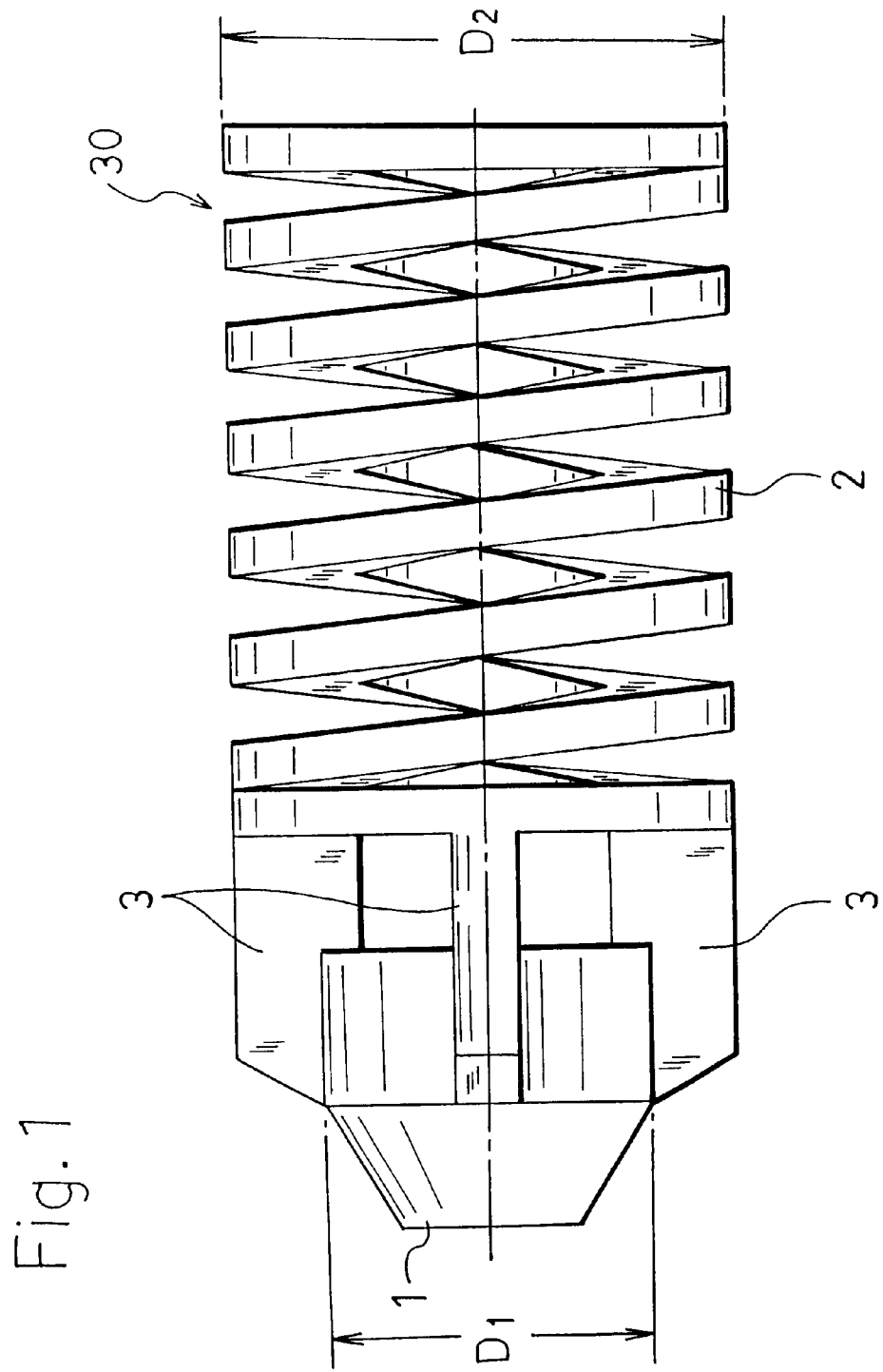
FIG. 1 is a side view of a check valve according to one embodiment of the present invention.

An embodiment of the present invention will be described with reference to FIGS. 1 to 3.

A check valve 30 according to the present invention is configured by integrally forming a valve element 1 and a compression coil spring 2 by a metal or a synthetic resin.

In the case where the valve element 1 and the compression coil spring 2 are integrally molded by a synthetic resin, for example, a fluororesin which is excellent in heat resistance and chemical resistance, such as PTFE (polytetrafluoroethylen), or PFA (perfluoroalkoxy) is used as the molding material. When the integral molding is performed by the injection molding method, the valve can be economically mass-produced.

The valve element 1 made of a synthetic resin is formed into a tapered truncated conical shape, and the compression coil spring 2 is formed into a cylindrical shape. The valve element 1 and the compression coil spring 2 are integrally molded into a shape in which the two members 1 and 2 are connected to each other via a plurality of connecting rods 3 that are integrally formed between a rear end portion of the valve element 1 and a front end portion of the compression coil spring 2, so that center axes of the two members coincide with each other.

As shown in FIG. 1, the outer diameter $D_2$ of the compression coil spring 2 may be arbitrarily set to be larger than the maximum outer diameter $D_1$ of the valve element 1, or, as shown in FIG. 4, the maximum outer diameter $D_1$ of the valve element 1 and the outer diameter $D_2$ of the compression coil spring 2 may be arbitrarily set to be substantially equal to each other.

FIG. 5 exemplarily shows a case where the thus configured check valve 30 is applied to a reciprocating pump 31 which is used for circulating or transporting chemical cleaning liquid in a semiconductor producing apparatus.

The reciprocating pump 31 is configured in the following manner. A pair of bellows 14 which can extend and contract in the same direction are opposingly disposed in cylindrical casings 13A and 13B which are continuously fixed to the sides of a pump head wall 12 having liquid inflow and outflow paths 10 and 11, respectively. Opening peripheral portions 14a of the paired bellows 14 are airtightly fixed to the pump head wall 12 via annular fixing plates 15, whereby each of the inner spaces of the casings 13A and 13B is hermetically partitioned into a liquid chamber 16a and an air chamber 16b, so as to configure a pair of pumping portions 17A and 17B.

The paired bellows 14 in the paired pumping portions 17A and 17B are interlockingly connected to each other via a plurality of connecting rods 18 which are passed through the pump head wall 12 and arranged in the circumferential direction, so that, when one of the bellows 14 contracts, the other bellow 14 extends. In the pump head wall 12, suction ports 19 and discharge ports 20 which communicate with the inflow and outflow paths 10 and 11 are formed so as to be opened in the liquid chambers 16a in the pumping portions 17A and 17B. Suction and discharge valve casings 21 and 22 which are molded into a cylindrical shape by a resin material such as a fluororesin are screwingly coupled to the suction ports 19 and the discharge ports 20, respectively. In this case, the check valve 30 configured as described above by the valve element 1 and the compression coil spring 2 which are integrated with each other is previously incorporated into each of the valve casings 21 and 22 so that the valve 1 is closely contacted with the corresponding valve seat 21a or 22a. Air holes 23 through which pressurized air is alternately supplied to the air chambers 16b are formed in bottom walls 13a and 13b of the casings 13A and 13B, respectively.

According to this configuration, pressurized air which is fed from a pressurized air supplying device (not shown) such as a compressor is alternately supplied to the air chambers 16b through the air holes 23, whereby the paired bellows 14 are driven via the connecting rods 18 to reversibly extend and contract, whereby the paired pumping portions 17A and 17B are caused to perform alternately sucking and discharging strokes. As a result, a pumping operation is conducted in which the liquid that flows from the inflow path 10 into the liquid chambers 16a via the check valves 30 in the suction valve casings 21 is discharged via the check valves 30 in the discharge valve casings 22, into the outflow path 11 in a substantially continuous manner.

As described above, in each of the check valves 30 incorporated into the reciprocating pump 31, the valve element 1 and the compression coil spring 2 are formed integrally with each other. Consequently, the valve element 1 and the compression coil spring 2 are not positionally deviated or disengaged from each other in the corresponding valve casing 21 or 22. Therefore, the urging force exerted by the compression coil spring 2 can always adequately act on the valve element 1, so that it is always possible to surely prevent a reverse flow and liquid leakage from occurring, whereby the reliability of quantitative volume feeding can be improved.

In each of the valve casings 21 and 22, the work of incorporating the compression coil spring 2 can be conducted simultaneously with that of incorporating the valve element 1. As compared with the case where these members are separately incorporated into a valve casing, therefore, they can be incorporated more efficiently.

The entire disclosure of Japanese Patent Application No. 2000-60710 filed on Mar. 6, 2000 including specification, claims, drawings, and summary are incorporated herein by reference in its entirety.

What is claimed is:

1. A check valve comprising: a valve element; and a compression coil spring which urges said valve element in a valve closing direction, wherein said valve elements and said compression coil spring are made of a fluororesin and formed integrally with each other; and wherein said valve element and said compression coil spring are integrally molded into a shape in which said valve element and said compression coil spring are connected to each other via a plurality of connecting rods that are integrally formed between a rear end portion of said valve element and a front end portion of said compression coil spring, so that center axes of said valve element and said compression coils spring coincide with each other.

2. A check valve according to claim 1, wherein said check valve is incorporated into a fluid apparatus.

3. A check valve according to claim 2, wherein said check valve is incorporated into a reciprocating pump.

4. A check valve according to claim 1, wherein an outer diameter of said compression coil spring is set to be larger than a maximum outer diameter of said valve element.

* * * * *

UNITED STATES PATENT AND TRADEMARK OFFICE
CERTIFICATE OF CORRECTION

PATENT NO.    : 6,513,546 B2
DATED         : February 4, 2003
INVENTOR(S)   : Masayoshi Katsura It is certified that error appears in the above-identified patent and that said Letters Patent is hereby corrected as shown below:

<u>Column 4,</u>
Line 25, "elements" should be -- element --; and
Line 35, "coils" should be -- coil --.

Signed and Sealed this

Sixth Day of May, 2003

JAMES E. ROGAN
*Director of the United States Patent and Trademark Office*